United States Patent [19]

Hansen et al.

[11] Patent Number: 4,978,508
[45] Date of Patent: Dec. 18, 1990

[54] METHOD AND APPARATUS FOR SOIL DECONTAMINATION

[75] Inventors: Andrew H. Hansen, Van Nuys; William C. Walker, Buena Park; Richard K. Walker, Pinole; Sam Braly, Buena Park, all of Calif.

[73] Assignee: Pacific Resource Recovery Corp., Van Nuys, Calif.

[21] Appl. No.: 239,278

[22] Filed: Sep. 1, 1988

[51] Int. Cl.$^5$ .................... B01J 19/08; B01J 19/12
[52] U.S. Cl. .................... 422/186.08; 422/186.1; 422/186.11; 422/186.14; 422/186.3; 204/158.2; 204/158.21
[58] Field of Search .......... 204/158.2, 158.21, 157.15; 422/186.08, 186.1, 186.11, 186.14, 186.3

[56] References Cited

U.S. PATENT DOCUMENTS

| | | | |
|---|---|---|---|
| 2,812,861 | 11/1957 | Bickford | 422/186.11 |
| 3,745,751 | 7/1973 | Zey | 422/186.1 |
| 3,959,661 | 5/1976 | Sandler | 422/156.14 |
| 4,793,931 | 12/1988 | Stevens | 422/186.3 |

Primary Examiner—John F. Niebling
Assistant Examiner—Ben C. Hsing
Attorney, Agent, or Firm—James E. Brunton

[57] ABSTRACT

A method and apparatus for decontaminating soil which has been contaminated with hazardous hydrocarbons. The apparatus includes a blending or scrubbing unit for mixing the contaminated soil with water and a suitable surfactant to form a slurry; screening apparatus operably interconnected with the blending unit for removing from the slurry particles larger than a predetermined size to form a small particle slurry; a reactor unit operably interconnected with the screening apparatus for reacting the slurry with ozone to form an ozone enriched slurry; an ultraviolet radiation generator for irradiating the ozone enriched slurry with ultraviolet radiation; a static mixer operably interconnected with the reactor unit for mixing a floculating material with the slurry to form a floculated slurry; and a belt-forming press for receiving the floculated material from the static mixer and for forming the floculated slurry into contamination free blocks.

4 Claims, 1 Drawing Sheet

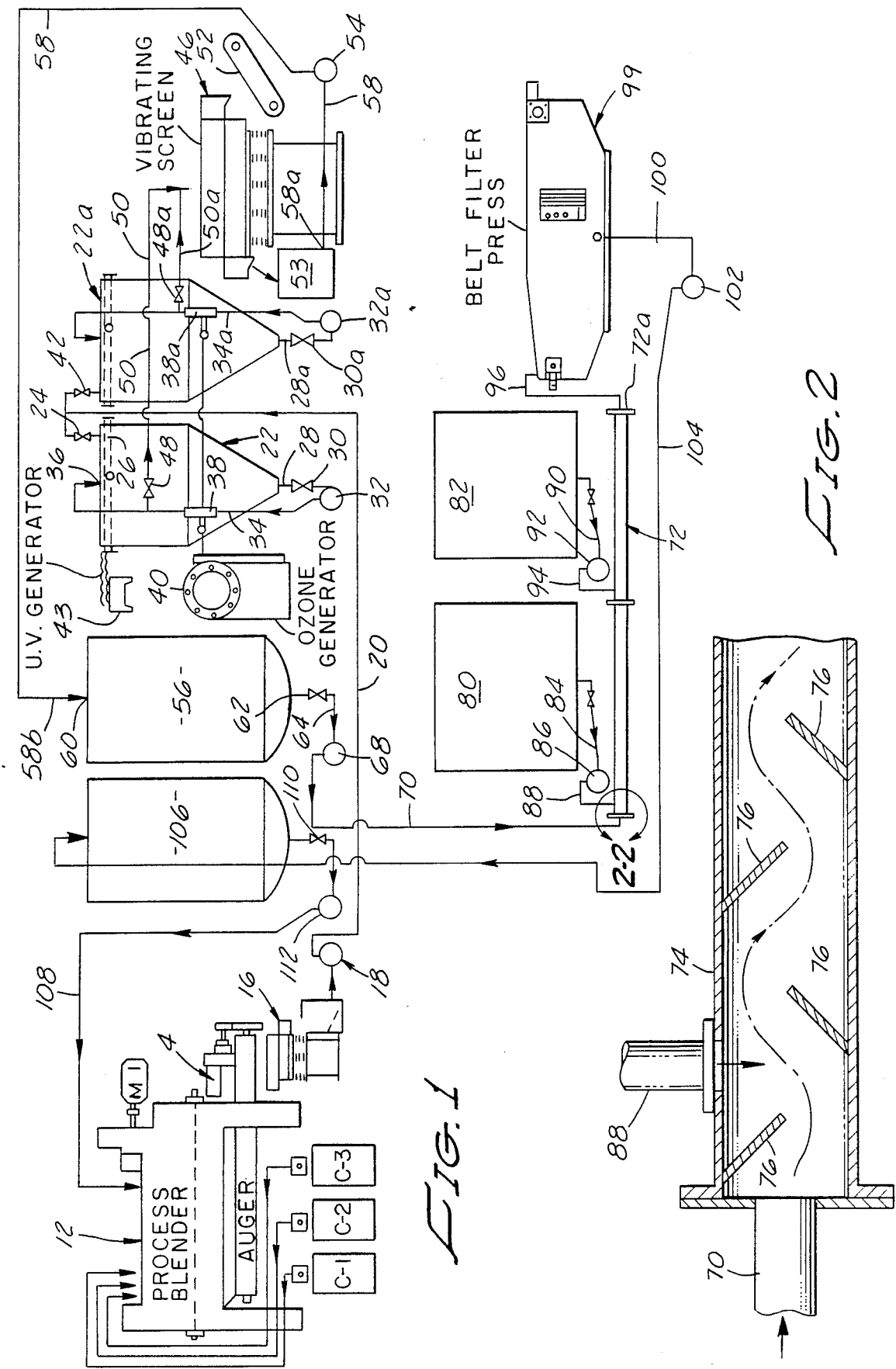

METHOD AND APPARATUS FOR SOIL DECONTAMINATION

BACKGROUND OF THE INVENTION

1. Field of the Invention

The present invention relates generally to methods and apparatus for the decontamination of solids. More particularly, the invention concerns an apparatus for the decontamination of soil which has been contaminated with hydrocarbon materials.

2. Discussion of the Prior Art

In recent years, the maintaining of the enviornment free from contamination by hazardous materials has come to be recognized by ecologists and various governmental agencies as being of paramount importance. Accordingly, meaningful steps have been taken to control waste disposal, including the disposal of hazardous hydrocarbon materials. Similarly, meaningful steps have been taken to clean up areas which have become contaminated in years past and which constitute health hazards.

In the past, rather crude and generally inefficient methods have been suggested for cleaning up hydrocarbon contamination and particularly for decontaminating soil which has become contaminated with hazardous hydrocarbons. Typically, these prior art approaches were expensive, highly labor intensive and generally unsuitable for the clean-up of large volumes of contaminated soils. The present invention, for the first time, offers a practical and efficient method for the decontamination of large quantities of contaminated soils.

SUMMARY OF THE INVENTION

It is an object of the present invention to provide a method and apparatus for the efficient decontamination of soils which have become contaminated with hazardous hydrocarbon materials such as polychlorinated phenyl (PCB), pentachlorophenol (PCP), trichlorocthylene (TCE) and the like.

It is another object of the invention to provide a method and apparatus of the aforementioned character in which large volumes of contaminated soil can be decontaminated quickly and efficiently using automatic, easy to use equipment which requires a minimum manpower investment.

It is another object of the invention to provide a method and apparatus of the character described which is safe to use and which has as its output decontaminated soil compacted into easy-to-handle blocks or brickettes.

Still another object of the invention is to provide an apparatus as described in the preceding paragraph which can be operated by unskilled workers and which can be set up on site with a minimum amount of difficulty.

Yet another object of the invention is to provide a method and apparatus of the class described which is inexpensive and highly reliable in use.

These and other objects of the invention are realized by an apparatus for decontaminating soil comprising a blending or scrubbing unit for mixing the contaminated soil with water and a suitable surfactant to form a slurry; screening apparatus operably interconnected with the blending unit for removing from the slurry particles larger than a predetermined size to form a small particle slurry; a reactor unit operably interconnected with the screening apparatus for reacting the slurry with ozone to form an ozone enriched slurry; an ultraviolet radiation generator for irradiating the ozone enriched slurry with ultraviolet radiation; a static mixer operably interconnected with the reactor unit for mixing a floculating material with the slurry to form a floculated slurry; and a belt-forming press for receiving the floculated material from the static mixer and for forming the floculated slurry into contamination free blocks.

BRIEF DESCRIPTION OF THE DRAWINGS

FIG. 1 is a generally schematic view of the apparatus of the invention for use in decontaminating soil which has been contaminated with hazardous hydrocarbon material;

FIG. 2 is a greatly enlarged fragmentary view, partly in cross-section, of the area designated in FIG. 1 by the numerals 2—2.

DESCRIPTION OF THE INVENTION

Referring to the drawings, the apparatus of the invention includes blending means for mixing the contaminated soil with water and a surfactant to form a slurry; first screening means operably interconnected with the blending means for removing from the slurry particles larger than about ⅛th inch in diameter; and reactor means operably interconnected with the screening means for reacting the small particle slurry with ozone.

In the form of the invention shown in FIG. 1, the blending means comprises a process blender, or pug mill, having internally mounted, moving blades adapted to agitate the contaminated soil and bring it into a generally plastic condition. Pug mill 12 is of standard construction and several suitable pug mill units are readily commercially available.

Operably associated with pug mill 12 are three holding tanks identified in FIG. 1 as C-1, C-2 and C-3. These tanks contain suitable surfactant solvents which, along with water, can be added to the contaminated soil to form a slurry of suitable consistency. While various types of surfactant solvents can be used, experience has shown that a mixture of sodium hydroxide, sodium laural sulphate and hydrogen peroxide will provide a suitable surfactant solvent for successfully carrying out the method of the invention. When such solvents are used, tank C-1 will contain sodium hydroxide, tank C-2 will contain sodium laural sulphate, and tank C-3 will contain hydrogen peroxide. A typical formulation for the soil decontamination method of the present invention would be 10 grams of sodium laural sulphate and 6 grams of sodium hydroxide per gallon of water. This mixture plus hydrogen peroxide is controllably added to the process blender using suitable pumping and valving devices to make the initial slurry. It is to be understood that, depending upon the type and extent of the contamination, various well-known surfactants can be used in practicing the method of the invention, including household laundry soap. The mixture of the appropriate surfactant solvents in the desired proportions and the pumping of the solvent from tanks C-1, C-2 and C-3 to the process blender is well understood and can readily be accomplished by those skilled in the art.

The contaminated soil surfactant slurry is continuously metered from the process blender by means of a variable speed auger 14 to the first screening means. In the present embodiment of the invention, the first screening means is provided in the form of a commercially available vibrating screen assembly 16 which is adapted to remove from the slurry particles of predetermined size as, for example, particles larger than about ⅛th inch in diameter. The larger particles which are separated from the slurry stream may be crushed into smaller sizes and reintroduced into the process blender if their level of contamination is above desired limits. On the other hand, if the surfactant contained within the process blender has reduced the level of contamination of the larger products to an acceptable level, the particles may be stacked as finished product and disposed of in a suitable manner.

Following separation of the larger particles from the slurry stream, the slurry is pumped by means of a suitable, commercially available slurry pump 18 from the outlet of the vibratory screen apparatus 16 toward the reactor means of the invention via a conduit 20 which preferably is a steel or plastic pipe having a diameter not less than about three inches.

In the instant form of the invention, the reactor means 20 comprises enclosure means shown here as a large tank 22, recirculating pump means for continuously recirculating the small particle slurry through the enclosure means or tank 22 and ozone generating means operably associated with the recirculating pump means for injecting ozone into the small particle slurry to form an ozone enriched slurry. As indicated in FIG. 1, the small particle slurry is pumped from apparatus 16 to the top of tank 22 and is controllably introduced into tank 22 via a standard type of valve 24 provided within conduit 20. The slurry passing through first control valve 24 enters tank 22 at a first inlet port 26 and tends to fall by force of gravity to the bottom of the tank. Connected proximate the bottom of the tank, is a conduit 28 which includes a second control valve 30. Interconnected with second valve 30 is the recirculating pump means provided here as a standard commercially available slurry pump 32. The output of slurry pump 32 is in turn connected with a conduit 34 which terminates at its upper end in a standard type of spray nozzle means for generating a slurry spray which is introduced into tank 22 via a second inlet 36. Typical pressures within conduit 34 are on the order of about sixty to eighty pounds per square inch.

Disposed intermediate the ends of conduit 34 is an eductor unit 38 which is operably interconnected with the ozone generating means of the invention. The ozone generating means is here provided in the form of a commercially available ozone generator of the character marketed by Ozone Systems, Ltd. of El Cajon, Calif. The ozone generator, generally designated by the numeral 40 in FIG. 1, cooperates with eductor 38 to continuously mix ozone into the small particle slurry being pumped through conduit 34. Accordingly, the slurry spray which is introduced to tank 22 at inlet 36 comprises an ozone enriched small particle slurry.

The ozone generator may be of various types including generators of the type wherein ozone is generated by an excimer laser operating in the ultraviolet range. Such a laser is available from Coherent Co. of Palo Alto, Calif. An organic dye laser can also be used which is activated by an argon laser which excites the organic dye and causes it to lase.

Forming an additional important aspect of the apparatus of the present invention, is the provision of illuminating means which is operably associated with the reactor means for irradiating with ultraviolet radiation the small particulate slurry spray being metered into tank 22. In the present form of the invention, the illuminating means comprises a series of ultraviolet lights which produce primarily 254 nanometer radiation. These ultraviolet lights are readily commercially available and are also obtainable from Ozone Systems, Inc. of Cajon, Calif. The ultraviolet radiation generated by the illumination means is destructive of ozone and causes a reaction similar to a catalytic reaction in that it greatly enhances both the speed and effect of ozone destruction of the targeted contaminants. Resident time for the slurry within tank 22 is dependent upon the type of contamination and the soil makeup, but normally is no more than a few hours.

As seen in FIG. 1, a second tank *22a* is provided for use as a secondary back-up to tank 22. Tank *22a* is interconnected with conduit 20 via a third valve 42. Connected at a lower outlet port *28a* of tank *22a* is a recirculating pump *32a* of identical construction to pump 32. Recirculating pump *32a* functions to recirculate the particulate slurry contained within tank *22a* via a conduit *34a*. Conduit *34a* is also provided intermediate its ends with an eductor *38a* which is operably with ozone generator 40.

It is apparent that by closing valve 24 and opening valve 42 the small particulate slurry flowing through conduit 20 from screening unit 16 will flow toward tank *22a*. Activation of the recirculating pump *32a* and opening of valve *30a* will cause recirculation of the small particulate slurry through tank *22a*. By switching ozone generator 40 from communication with eductor 38 to eductor *38a*, the slurry flowing through conduit *34a* can be reacted with ozone to form an ozone enriched slurry. As the ozone enriched slurry is introduced into tank *22a* through a suitable spray nozzle provided at the outlet end of conduit *34a*, the spray will also be illuminated with ultraviolet radiation from the ultraviolet generator 43.

Operably interconnected with conduits 34 and *34a* by means of conduits 50 and *50a* is a second screening means for removing particles larger than a second predetermined size as, for example, about 80 mesh, from the ozone enriched slurry which may be flowing through the conduits. In the present embodiment of the invention, in the second screening means is provided in the form of a second vibrating screen apparatus 46. By opening one or the other of valves 48 and *48a* which are disposed within conduits 50 and *50a* respectively, the ozone enriched particulate slurry can be directed from the reactor means toward vibrating screen apparatus 46 where once again the larger particles contained wtihin the small particle slurry can be separated out to form a fine particle slurry.

The particles which are separated from the small particle slurry are deposited on a conveyor 52 from which they can be stacked as clean, finished product. The remaining slurry is collected in a collection tank 53. This fine particle slurry is then pumped from tank 53 by a slurry pump 54 into a surge tank 56 through a conduit 58. As indicated in FIG. 1, the inlet end *58a* of conduit 58 is interconnected with tank 53 while the outlet end *58b* of conduit 58 is interconnected with surge tank 56 at an inlet *58b* port 60 thereof. Tank 56 also includes an outlet port 62 to which is connected a conduit 64. Disposed within conduit 64 is a control valve 66 which controls the flow of slurry from tank 56 toward a pump 68. Pump 68 functions to pump slurry via a conduit 70 toward the mixer means of the invention.

The mixer means functions to mix a floculating material with the fine particle slurry to form a floculated material which can readily be formed into discrete segments such as blocks of a desired size and shape. In the embodiment of the invention shown in the drawings, the mixer means is provided in the form of an elongated static mixer 72. As best seen by referring to FIG. 2, static mixer 72 comprises an elongated tubular member 74 having disposed therewithin a series of motionless mixer blades or baffles 76. Blades 76 function to cause the slurry to flow along a circuitous flow path from one end of the mixer 72 to the opposite end in the manner indicated by the arrow in FIG. 2.

Operably associated with mixer 72 are holding tanks 80 and 82 for holding the floculating materials. For example, tank 82 is adapted to contain a chemical such as lime, magnesium oxide, diatamaceous earth or various combinations thereof which can be controllably added to the slurry flowing through the static mixer to provide additional body to the slurry. These chemicals are added to mixer 72 through a conduit 84 which is interconnected with the inlet of a pump 86. The outlet of pump 86 is interconnected with mixer 72 via a conduit 88. The amount of body enhancing material contained within tank 82 which is added to the fine particle slurry varies depending upon the moisture content of the slurry. However, enough body enhancing material is added to provide sufficient body to the slurry to enable it to be expediciously processed into blocks by the forming means, the nature of which will presently be discussed.

Contained within tank 82 is a suitable anionic, cationic or nonionic combination of polymers which can also be added to the slurry flowing through mixer 72 in a manner to effect sufficient flocculation thereof to permit the separation of soil from the water contained within the slurry. The polymer material can be controllably added to mixer 72 by means of a valved conduit 90 which is interconnected with the inlet of a pump 92. The outlet of pump 92 is interconnected with a conduit 94 which in turn, is interconnected with mixer 72.

The outlet end 72a of mixer 72 is operably interconnected via a conduit 96 with the previously mentioned forming means of the invention. The forming means functions to continuously form the floculated slurry received from mixer 72 into discrete segments such as brickettes or blocks of contamination free soil suitable for ordinary purposes. In the embodiment of the invention shown in the drawings, the forming means is provided as a belt-filter press 99 of a standard, commercially available type. An appropriate belt-filter press for the present application is obtainable from G & W Enterprises of Palmdale, Calif.

During formation of the discrete soil segments or blocks, any liquid remaining within the slurry can be removed from the belt-filter press via a conduit 100 which is interconnected with a pump 102. Connected at the outlet of pump 102 is a conduit 104 the outlet end of which is connected to the top of a recycle storage tank 106. Tank 106 is in turn connected with the process blender by a conduit 108. By opening a valve 110 provided in conduit 108 and by energizing pump 112, water contained within tank 106 can be controllably introduced into the process blender as needed and mixed with the contaminated soil to be processed by the apparatus of the invention.

The method of decontaminating soil contaminated with hazardous hydrocarbons comprises the steps of first loading the contaminated soil to be decontaminated by means of a conveyor belt, skip loader or other convenient means into the process blender 12. With the process blender energized, the contaminated soil is mixed with water and a suitable surfactant of the character previously described to form a slurry. After appropriate mixing has taken place, the slurry is controllably removed from the process blender by an auger 14 and deposited onto screening assembly 16 for removal from the slurry of particles larger than a predetermined size as, for example, about ⅛th of an inch in diameter. The small particle slurry thus formed is transported to one of the two tanks 22 or 22a of the ractor means of the invention. The fine particle slurry contained within the tank is then continuously recirculated using recirculating pump 32 or 32a. As the small particle slurry is recirculated through the tank, ozone is continuously introduced into the slurry by an inductor 38 or 38a to form a highly ozone enriched slurry. The ozone enriched slurry is pumped to the top of the tank where it is reintroduced into the tank in the form of a fine spray. An important step in the method of the invention is the continuous exposure of the recirculating ozone enriched slurry to ultraviolet light. This radiation is destructive of ozone and causes a reaction similar to a catalytic reaction in that it greatly enhances both the speed and effect of ozone destruction of the targeted contaminants. Following exposure of the ozone enriched slurry to ultraviolet radiation which is on the order of about one to eight hours, the slurry is transported to a second vibrating screen mechanism wherein particles larger than a predetermined size, as for example, about 80 mesh are removed from the slurry to form a fine particle slurry. The larger particles are gathered for suitable disposal or reprocessing. The fine particle slurry is then introduced into a static mixer, such as mixer 72, which in turn is interconnected with a belt-filter press. As the fine slurry travels through the static mixer, a floculating material selected from a group consisting of lime, magnesium oxide and diatamaceous earth is controllably added to the fine slurry. Also added to the slurry is a polymer material selected from a group consisting of anionic, cationic and nonionic polymers. The amounts of floculating material and polymer to be added to the fine particle slurry depends upon the nature of the soil being processed and the amount of water present in the slurry. The floculated slurry thus-formed is conveyed to the belt-filter press where it is pressed into discrete segments such as blocks or brickettes of soil which is now decontaminated and suitable for standard soil uses.

Having now described the invention in detail in accordance with the requirements of the patent statutues, those skilled in this art will have no difficulty in making changes and modifications in the individual parts or their relative assembly in order to meet the specific requirements or conditions. Such changes and modifications may be made without departing from the scope and spirit of the invention, as set forth in the following claims.

I claim:

1. An apparatus for decontaminating soil which is contaminated with hazardous hydrocarbons, comprising:
   (a) blending means for mixing the contaminated soil with water and a surfactant to form a slurry;
   (b) first screening means operably interconnected with said blending means for removing from said slurry particles larger than a first predetermined size to form a small particle slurry;

(c) reactor means operably interconnected with said screening means for reacting said small particle slurry with ozone, said reactor means comprising:
  (i) enclosure means for receiving said small particle slurry from said first screening means;
  (ii) recirculating pump means for continuously recirculating said small particle slurry through said enclosure means; and
  (iii) ozone generating means operably associated with said recirculating pump means for injecting ozone into said small particle slurry to form an ozone enriched slurry;

(d) illuminating means operably associated with said reactor means for illuminating said ozone enriched slurry with ultraviolet light;

(e) second screening means operably connected with said reactor means for removing particles larger than a second predetermined size from said ozone enriched slurry to form a fine particle slurry;

(f) mixer means operably interconnected with said second screening means for mixing floculating material with said fine particle slurry to form a floculated slurry;

(g) forming means for forming said floculated slurry into discrete segments.

2. An apparatus for decontaminating soil as defined in claim 1 in which said enclosure means comprises a tank having an inlet and an outlet, and in which said recirculating pump means comprises a pump having a spray generating outlet, said pump being adapted to continuously pump said small particle slurry from said outlet of said tank to said inlet of said tank for introduction of said small particle slurry into said tank in the form of a spray.

3. An apparatus as defined in claim 2 in which said illuminating means comprises a source of ultraviolet radiation adapted to continuously direct ultraviolet radiation toward said spray being introduced into said tank.

4. An apparatus for decontaminating soil which is contaminated with hazardous hydrocarbons, comprising:

(a) blending means for mixing the contaminated soil with a mixture of water, sodium hydroxide, sodium laural sulphate and hydrogen peroxide to form a slurry;

(b) a first vibratory screen apparatus operably interconnected with said blending means for removing from said slurry particles larger than about $\frac{1}{8}$th inch in diameter to form a small particle slurry;

(c) reactor means, including recirculating pump means and ozone generating means, operably interconnected with said screening means for continuously reacting said small particle slurry with ozone to form an ozone enriched, small particle slurry;

(d) illuminating means operably associated with said reactor means for continuously illuminating said ozone enriched, small particle slurry with ultraviolet light;

(e) a second vibratory screen apparatus operably connected with said reactor means for removing particles larger than about 80 mesh from said small particle slurry to form a fine particle slurry;

(f) mixer means operably interconnected with said second screening means for mixing lime and an anionic polymer material with said fine particle slurry to form a floculated slurry; and (g) forming means for forming said floculating slurry into brickettes.

* * * * *